United States Patent
Spannhake et al.

(10) Patent No.: US 6,782,989 B2
(45) Date of Patent: Aug. 31, 2004

(54) PROCESS FOR SWITCHING BETWEEN MAINS SUPPLY AND A FREQUENCY INVERTER AND VICE VERSA

(75) Inventors: Stefan Spannhake, Berlin (DE); Herbert Horbrugger, Berlin (DE); Reinhard Henkel, Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/147,702

(22) Filed: May 16, 2002

(65) Prior Publication Data

US 2003/0000801 A1 Jan. 2, 2003

(30) Foreign Application Priority Data

Jun. 15, 2001 (DE) ............................... 101 28 840

(51) Int. Cl.[7] ............................................. B66B 21/00
(52) U.S. Cl. .......................... 198/330; 198/324; 198/322
(58) Field of Search ................................. 198/322, 324, 198/330, 331; 318/802, 798, 274

(56) References Cited

U.S. PATENT DOCUMENTS

| | | | | |
|---|---|---|---|---|
| 4,232,776 A | * | 11/1980 | Dean | 198/322 |
| 4,588,065 A | * | 5/1986 | Maiden et al. | 198/323 |
| 4,600,865 A | * | 7/1986 | Caputo | 318/274 |
| 4,631,467 A | * | 12/1986 | Herrmann et al. | 318/798 |
| 4,738,346 A | * | 4/1988 | Matsueda et al. | 198/330 |
| 4,748,394 A | | 5/1988 | Watanabe | |
| 5,083,653 A | * | 1/1992 | Sakata et al. | 198/322 |
| 5,526,256 A | * | 6/1996 | Sakata et al. | 364/184 |
| 5,819,202 A | * | 10/1998 | Sato et al. | 702/33 |
| 5,950,797 A | * | 9/1999 | Aulanko et al. | 198/330 |
| 6,049,189 A | * | 4/2000 | Markus et al. | 318/802 |
| 6,161,674 A | * | 12/2000 | Aulanko et al. | 198/330 |
| 6,273,234 B1 | * | 8/2001 | Balzer-Apke et al. | 198/323 |
| 2002/0162726 A1 | | 11/2002 | Henkel et al. | |
| 2002/0189905 A1 | | 12/2002 | Spannhake et al. | |

FOREIGN PATENT DOCUMENTS

| | | |
|---|---|---|
| DE | 35 23 626 | 7/1992 |
| DE | 38 09 199 | 2/1994 |
| DE | 196 04 207 | 3/1998 |
| DE | 199 60 491 | 7/2001 |

OTHER PUBLICATIONS

Halbleiter–Schaltungstechnik, U. Tietze Ch. Schenk.

* cited by examiner

Primary Examiner—Kathy Matecki
Assistant Examiner—Rashmi Sharma

(57) ABSTRACT

Process and device for controlling the drive of a conveyor system (10), specifically in the form of an escalator or passenger conveyor, which can be switched from load to no-load operation, comprising a drive motor (26) and a variable frequency converter (42), which is at least controllable with respect to the frequency of its output voltage, wherein, under load, the drive motor (26) is supplied with a line voltage with an essentially constant line frequency and, at no-load, is supplied the output voltage of the variable frequency converter's (42), wherein, prior to a changeover from no-load to load operation, the output frequency of the variable frequency converter (42) is essentially brought with phase accuracy to the line frequency by means of a PLL device (30), and wherein this changeover is brought about as soon as this phase conformance has been realized.

25 Claims, 4 Drawing Sheets

PROCESS FOR SWITCHING BETWEEN MAINS SUPPLY AND A FREQUENCY INVERTER AND VICE VERSA

FIELD OF THE INVENTION

The invention relates to a process and device for controlling the drive mechanism of a conveyor system in the form of an escalator or passenger conveyor which can be switched between load and no-load operation. The conveyor system comprises AC line voltage terminals, an electric drive motor, specifically, in the form of an induction motor or synchronous motor, and a frequency converter.

BACKGROUND OF THE INVENTION

A typical conveyor system for the transportation of passengers in the form of an escalator or passenger conveyor includes a plurality of closely adjacent running plates in the form of a continuous belt which are moved with the aid of the drive motor.

In order to reduce the power consumption and wear and tear on these types of conveyor systems, methods have been developed in which the conveyor movement of such conveyor systems is activated only when conveyance is required, while bringing the system to a stop otherwise. For this purpose, a device signaling the need for conveyance, for instance, in the form of a step mat which is arranged in the direction of conveyance in front of the conveyor system, an on/off photocell control device, or a manually operated switch, is provided, by means of which the presence of the need for conveyance can be determined. If a need for conveyance exists, for instance, because a passenger has stepped onto the step mat, the conveyor system is set in the conveyance motion for a predefined period of time and turned off again if no further need for conveyance has been detected within a predefined time period.

Preventing the abrupt turning on and off of the drive motor during frequent starting and stopping of the conveyor system to avoid peak loading by instead allowing the rotational speed of the drive motor to ramp up and ramp down is known in the prior art from WO 98/18711. Induction motors are predominantly used for these types of conveyor systems. Because the rotational speed of an induction motor, which depends on the frequency of the alternating voltage supplied to it, will be constant when it is directly supplied from an AC line with constant line frequency, an adjustable frequency converter is employed so that the line frequency supplied to it can be converted into a different output frequency.

The cost of a frequency converter which supplies the drive motor of an escalator or passenger conveyor under load is high because the cost of the frequency converter increases in direct proportion to the output power the frequency converter is capable of delivering.

In order to lower acquisition and operating costs, WO 98/18711 stipulates that the conveyor system be driven with full conveyance speed only under load but that in stand-by or in no-load operation, when no conveyance need exists, it is only driven at reduced, no-load speed, and that the drive motor will be supplied by the frequency converter only under no-load operation and changeover processes, while, however, under load, it will be supplied directly by the AC power line. This makes it possible to design the frequency converter with a much lower maximum power rating, which results in considerable cost savings compared to a frequency converter whose maximum power rating is matched to the load of the conveyor system. Then, if after carrying out a conveyance task, no further need for conveyance is indicated, the conveyor system known in the prior art from WO 98/18711 initially changes over to no-load operation and is not switched to stop until no new need for conveyance is indicated for a predefined time period after its changeover to no-load operation.

As a result of the measures mentioned, a considerable reduction of peak loads and abrupt changes in the speed of the conveyor systems is realized. However, while the drive motor alternates between being supplied power by the AC line and by the frequency converter, high transient currents may still occur; to be more specific, this is due to deviations between the line frequency and the output frequency of the frequency converter and their phase angles at the time of a changeover between power line and the frequency converter feeding of the drive motor and because of the induced voltage of the drive motor which can lead to overloading the frequency converter and to abrupt changes in the movement of the conveyor system.

Such manifestations have been overcome with a process which was disclosed in the subsequently published previous German Patent Application 199 60 491.6 of the applicant and in which the line voltage and the frequency converter output voltage are compared with respect to frequency and phase angle, and the frequency converter is controlled to an output frequency that exhibits a predefined frequency spacing from the line frequency. If a need for a changeover of the conveyor system from load to no-load operation or vice versa has been signaled by means of a conveyor signaling device, a changeover control signal which triggers the changeover of the power supplied to the drive motor by the frequency converter feeding and the power line is generated at that point in time after the need to switch operating modes has been signaled, at which point the output frequency of the frequency converter both exhibits the predefined frequency spacing with respect to the line frequency and a predefined phase spacing has been achieved between the output frequency of the frequency converter and the line frequency. By not emitting the changeover control signal at time when the output frequency of the frequency converter matches the line frequency, with respect to both frequency and phase, but instead, "with foresight," emitting it at time when the output frequency of the frequency converter exhibits the predefined frequency spacing with respect to the line frequency and the predefined phase spacing between the output frequency of the frequency converter and the line frequency have been reached, consideration is given to the fact that switching devices, usually contactors, which are employed for the changeover between no-load and load operations, on the one hand, work without time lags and that, on the other hand, a zero-current period is required between the break of one contactor and the make of the other contactor, in order to avoid short-circuiting the network via the frequency converter. Between the emission of a changeover control signal and the break of the previously leading contactor, and, finally, the make of the other contactor, a certain inherent response time delay exists which depends on the specific components of the specific conveyor system and is given consideration through the aforementioned frequency spacing and the aforementioned phase spacing.

The process described in the German Patent Application 199 60 491.6 has proven to be successful. There are cases, however, in which fewer control expenditures are desired and this is to be realized with the present invention.

SUMMARY OF THE INVENTION

The present invention provides a process for controlling the drive mechanism of a conveyor system which can be switched between load and no-load operation, specifically, in the form of an escalator or passenger conveyor, exhibiting a drive motor and a variable frequency converter which, at least, is controllable with respect to the frequency of its output voltage, wherein, under load, the drive motor is supplied by the line voltage with an essentially constant line frequency, and at no-load, it is supplied with the output voltage of the variable frequency converter, the output variable frequency of the frequency converter, prior to a changeover from no-load to load operation or vice versa, is essentially brought to the line frequency with accurate phase by means of a PLL device, and this changeover is achieved as soon as this phase agreement occurs.

On the other hand, the invention provides electronic control device for controlling the drive mechanism of a conveyor system, specifically, in the form of an escalator or passenger conveyor, which can be switched between load and no-load operation and which comprises an AC line voltage terminal for supplying line voltage with an essentially constant line frequency and a drive motor, comprising a variable frequency converter, which at least is controllable with regard to its output voltage frequency, a controllable changeover device with a load operation switching state in which the drive motor is coupled to the AC line voltage, and a no-load switching state in which the drive motor is coupled to the variable frequency converter, in such a way that under load, the drive motor is supplied the line voltage with an essentially constant line frequency and at no-load is supplied the output voltage of the variable frequency converter, and a PLL device, by means of which, prior to a changeover from no-load to load operation or vice versa, the output frequency of the variable frequency converter can essentially be matched to the line frequency with phase accuracy, where the changeover of the changeover device is controllable as a function of whether such phase matching is achieved.

In one embodiment of the invention, the line frequency is fed to the PLL device on the input side as the setpoint phase and the output frequency of the variable frequency converter is fed as the actual phase. In this manner, the output frequency of the variable frequency converter is changed until the output frequency of the PLL device and, hence, of the variable frequency converter, locks to the line frequency.

In one embodiment of the invention, in the context of a changeover from no-load to load operation, a ramped rise of the output frequency of the variable frequency converter is controlled first before the output frequency of the variable frequency converter is brought to the line frequency by means of the PLL device and a changeover is carried out from variable frequency converter supply to the line supply. In the same manner, a ramped decrease in the output frequency of the variable frequency converter can be controlled during a changeover from load to no-load operation after a changeover has been carried out from the line supply to the variable frequency converter supply. Thus, the changes in the rate of movement of the conveyor system are made more gradual, so that changes from both no-load to load operation and from load to no-load operation can be made unabruptly.

In one embodiment of the invention, the changeover from no-load to load operation occurs by means of a changeover device which exhibits a first controllable switching device which connects the drive motor to the AC line voltage, and a second controllable switching device which connects the drive motor to the variable frequency converter, wherein only one of the two switching devices can be electrically connected and the electrical connection of the respectively disconnected switching device is only possible after a predefined zero-current period after the switching device which has been electrically connected to that point has been disconnected. This takes into consideration that the contactors which are usually employed for such switching devices do not work without a time lag and ensures that a simultaneous connection of both switching devices will not occur, which could result in a damaging short circuit of the network via the variable frequency converter.

During the zero-current period, the drive motor remains without power supply, which leads to a decrease in the rotational speed of the drive motor during the zero-current period due to the inherent friction of the conveyor system, which, in turn, results in a reduction in the magnitude and frequency of the motor terminal voltage.

In order to avoid impairment of the smooth changeover between no-load and load operation due to these occurrences during these zero-current periods, a third controllable switching is provided in one embodiment of the invention, by means of which the setpoint phase input terminal of the PLL device is connected to the AC line voltage in a first switching state and to a motor terminal at which the motor terminal voltage can be picked up in a second switching state, wherein the third switching device is controlled in such a way that during the zero-current period, the setpoint phase input terminal is coupled to the motor terminal and otherwise is coupled to the AC line voltage. Thus, the output frequency of the variable frequency converter can be brought to a frequency during the zero-current period of the drive motor that corresponds to the decrease in the rotational speed of the drive motor during the zero-current period.

This measure has the effect that, during a changeover from load to no-load operation, i.e., during a changeover from line supply to the variable frequency converter supply at the time point that the motor is connected to the output of the variable frequency converter, the output frequency of the variable frequency converter is frequency- and phase-matched to the rotational speed and the motor rotation position of the drive motor.

Because, during the zero-current period, the rotational speed of the drive motor decreases, one embodiment of the invention provides that, prior to the changeover process, the variable frequency converter regulates the drive motor to a rotational speed when the changeover from no-load to load operation occurs, which exceeds the motor rotational speed which corresponds to the line frequency, by the amount by which the motor rotational speed decreases during the zero-current period. The amount by which the motor rotation speed decreases during the zero-current period can be determined for the respective conveyor system, for instance, by taking measurements, and can be taken into consideration in the design of the control circuit of the variable frequency converter.

Because not only the motor rotation speed but also the motor terminal voltage decreases during the zero-current period, one embodiment of the invention provides that the output voltage of the variable frequency converter be adjustable, that the motor terminal voltage be measured at least during the zero-current period, and that the output voltage of the variable frequency converter be matched to the motor terminal voltage during the zero-current period. This also facilitates a smooth transition during the changeover from the line supply to the variable frequency converter supply of the drive motor.

Because, normally, the motor data and the zero-current period for any specific conveyor system are known values, the decrease in the motor terminal voltage which occurs during the zero-current period can be determined from said data and used. In this case, a measuring device for the motor voltage is not required.

In their output stage, standard variable frequency converters contain bridge circuits with electronic switches that are triggered by switch control pulses, the frequency of which determines the output frequency of the variable frequency converter. In one embodiment of the invention, the control of the value of the variable frequency converter output voltage, which was discussed previously, is brought about by pulse-width modulation of the switch control pulses.

In one embodiment of the invention, the PLL device, in the standard series connection, comprises a phase detector, a loop filter, and a voltage-controlled oscillator, wherein the line voltage or, during the zero-current period, the motor terminal voltage is supplied to the phase detector as the setpoint signal and the voltage of the variable frequency converter is supplied as the actual signal.

In one embodiment of the invention, the variable frequency converter and at least the voltage-controlled oscillator of the PLL device are integrated in a variable frequency converter circuit arrangement. The phase detector and/or the loop filter may be realized as hardware components or in software by programming the variable frequency converter circuit arrangement. In the latter case, the actual value can be sensed from OVF 42 and processed directly in the software module for the PLL device as the actual value.

In the event that the variable frequency converter is realized through a programmable circuit arrangement and that the PLL function is brought about by programming such a variable frequency converter, a control device in accordance with the invention can be produced with a particularly low expenditure and thus at particularly low cost.

BRIEF DESCRIPTION OF THE DRAWINGS

The invention will be explained below in greater detail by means of embodiments. The drawings show

DETAILED DESCRIPTION OF THE PREFERRED EMBODIMENT

Figure 1:
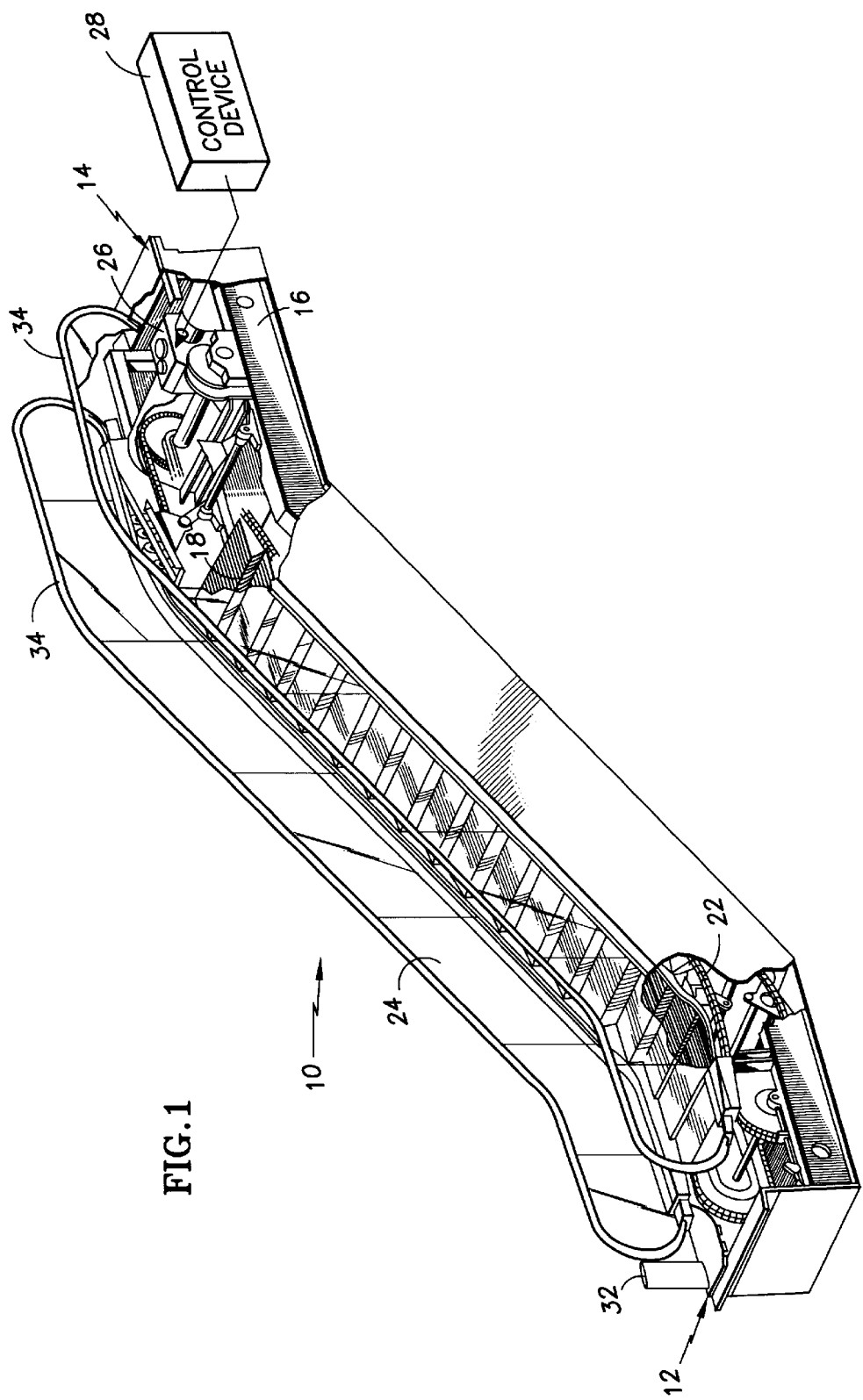
FIG. 1 is a perspective view of an escalator in partial cross section.

An escalator, as shown in the partial cross section, perspective view of FIG. 1, will be examined as an example of a conveyor system in accordance with the invention.

The escalator 10 shown in FIG. 1 includes a lower stairway landing 12, an upper stairway landing 14, a supporting framework 16, a plurality of successively concatenated step plates 18 which form a continuous belt, a drag chain 22 to drive the step plates 18, a pair of balustrades 24 which extend on both sides of the concatenated step plates 18, a drive motor 26 which is coupled with the drag chain 22 in the form of a drive means, a control device 28 which acts concurrently with the drive motor 26, and a device signaling the need for conveyance in the form of a passenger sensor 32, which may, for instance, be an on/off photocell control device but which may also be constituted by a step mat, or a hand or foot switch. The step plates 18 constitute the platforms for the conveyance of passengers between the two stairway landings 12 and 14. Each of the two balustrades 24 includes a moving hand rail 34 which is driven at the same speed as the step plates 18.

The control device 28 determines the electric power that is supplied to the drive motor 26 and thereby controls the rotational speed of the drive motor 26, and, hence, the speed at which the step plates 18 move.

Figure 2:
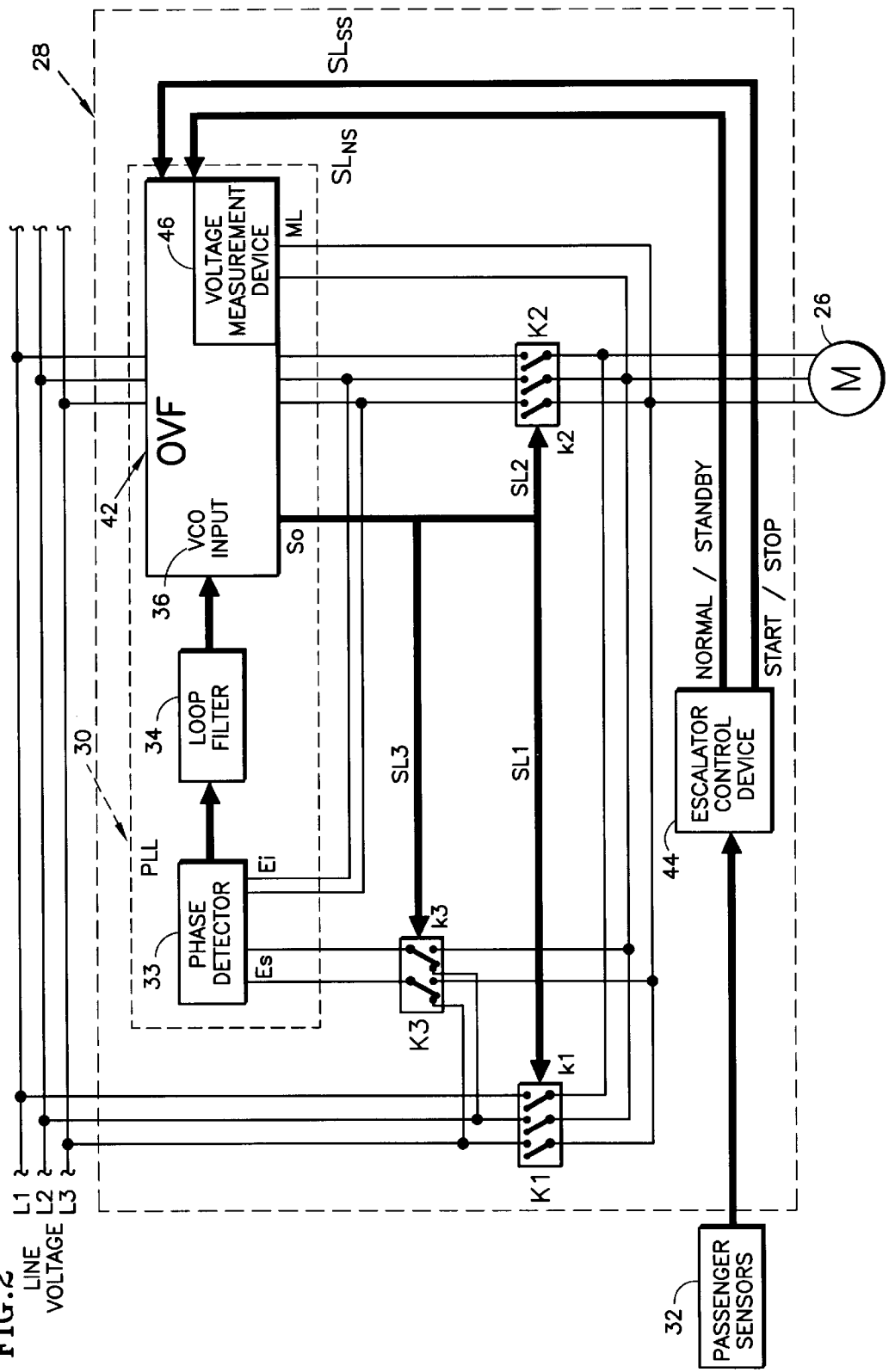
FIG. 2 is an electrical schematic circuit diagram, partially as a block diagram, with a control device in accordance with the invention.

FIG. 2 shows an electric circuit diagram with an embodiment of a control device 28 in accordance with the invention. The control device 28 includes a PLL device 30 (called PLL 30 in the following text) of a type that is generally known in the prior art, which, in series connection, comprises a phase detector 33 on the input side, a downstage loop filter 34, and a downstage voltage-controlled oscillator (VCO) 36. The voltage-controlled oscillator 36 is integrated with a variable frequency converter device to form a circuit OVF 42 with a variable output frequency (OVF 42 for short below). Moreover, the control device 28 includes a controllable changeover device with a first contactor K1, a second contactor K2, and a third contactor K3. OVF 42 is under the controlling influence of an escalator control system 44, the operation of which is dependent upon the passenger sensor 32.

The entire circuit arrangement is designed as a three-phase system and is supplied by a three-phase AC line with three phase lines L1, L2, and L3. A different number of phases is possible.

On the input side, the control device 28 is connected to the three lines L1–L3 of the power line. This means that, on the one hand, the input side of the contactor K1 and, on the other hand, the input side of OVF 42 is connected to the lines L1–L3. Thus, the input frequency of the variable frequency converter that is contained in OVF 42 is provided by the line frequency. The drive motor 26 is connected to the lines L1–L3 of the power line via the contactor K1 and to the output side of OVF 42 via the contactor K2.

The phase detector 33 has a setpoint signal input Es and an actual signal input Ei to which the two signals are fed, the phase difference of which is to be determined by means of the phase detector 33. One phase of the three-phase system is fed to the setpoint signal input Es. A changeover device K3 is connected in series with the setpoint signal input Es via which, depending upon the switching position of K3, the setpoint signal input Es is either connectable to the two lines L2 and L3 of the power line, or to two of the three supply terminals of the drive motor 26. The actual signal input Ei of the phase detector 33 is connected to two of the three output lines of OVF 42.

The control device 44 of the escalator and OVF 42 are connected to each other via two control lines $SL_{NS}$ or $SL_{SS}$ over which a signal "normal/stand-by" or a signal "start/stop" is transmitted. OVF 42 receives control commands via the two control lines $SL_{NS}$ and $SL_{SS}$ which depend on the output signal of the passenger detector 32.

Control inputs k1, k2, and k3 of K1, K2, and K3, respectively, are connected to a control output SO of OVF 42 via control lines SL1, SL2, and SL3, respectively, via which they can be controlled to the respectively required switching state. Instead of the discrete control lines SL1, SL2, SL3, $SL_{NS}$, and $SL_{SS}$, a field bus can be used for the transmission of the control signals.

OVF 42 is equipped with a voltage sensing device 46 which is two of the three supply terminals of the drive motor 26 via a double measuring line ML.

The mode of operation of the circuit arrangement shown in FIG. 2 will be explained more closely by means of the timing diagrams shown in FIGS. 3 and 4.

Figure 3:
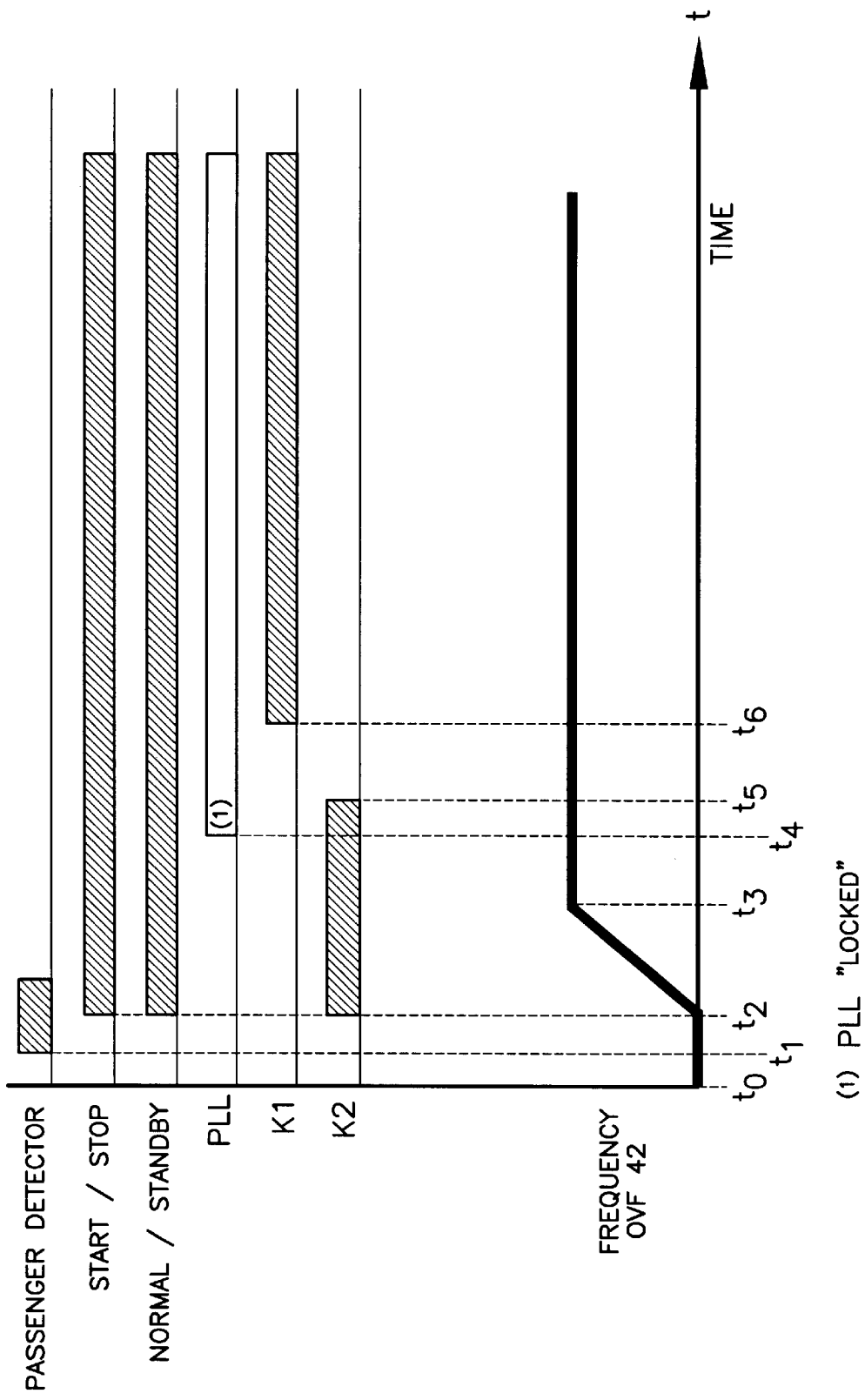
FIG. 3 is a temporal representation of processes in the context of a changeover of the conveyor system from stopped to load operation.

FIG. 3 shows timing diagram for a changeover from stoppage to loaded operation of the escalator 10. From top to bottom, this figure shows the output signal of the passenger detector 32, the control signals "start/stop" and "normal/stand-by" which are delivered by the escalator control device 44 to OFV 42, the state of the PLL device 30, the switching states of the contactors K1 and K2, and the output frequency of OVF 42 which, respectively, are dependent upon the time t.

Figure 4:
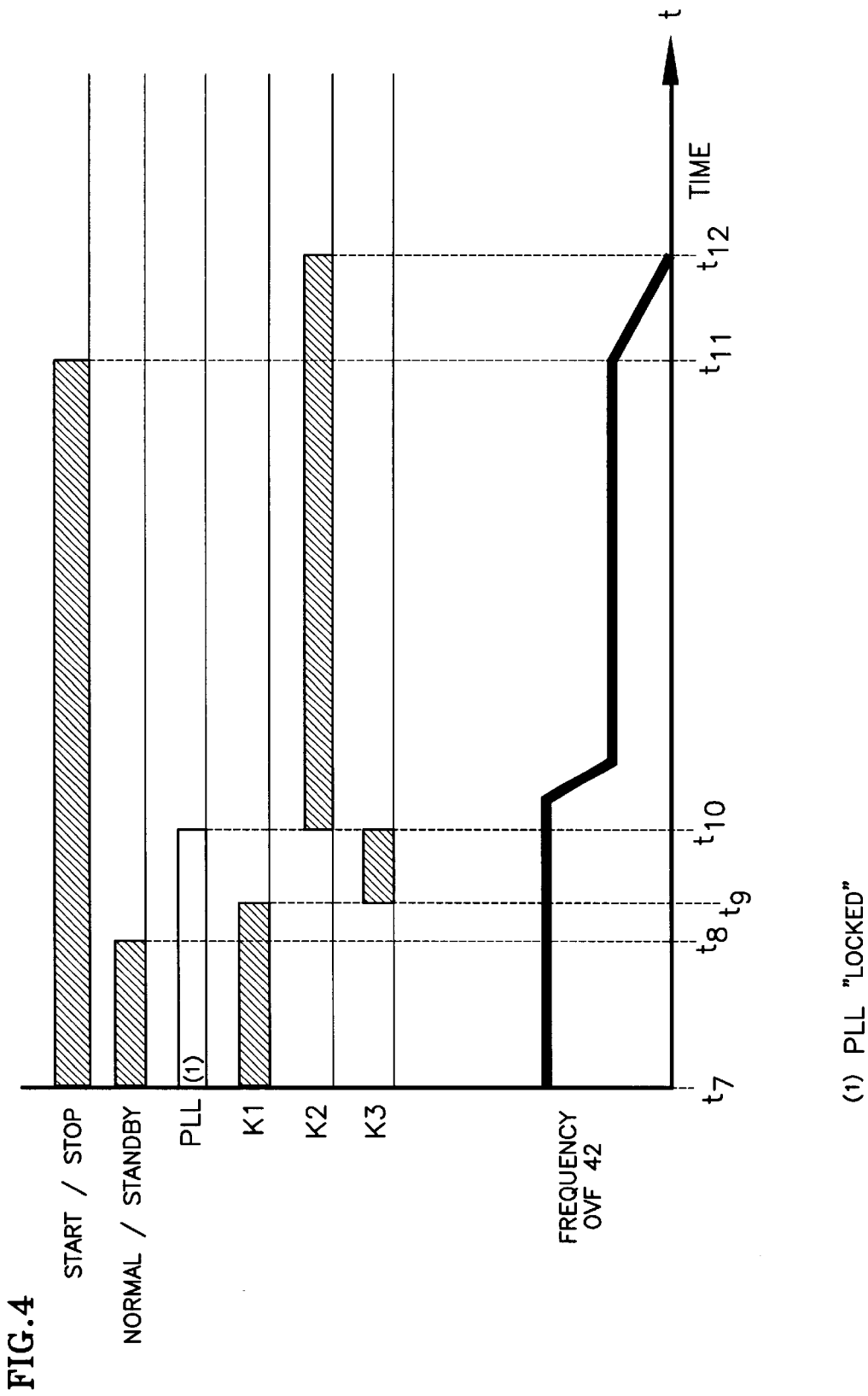
FIG. 4 is a temporal representation of processes in the context of a changeover of the conveyor system from load to no-load operation.

FIG. 4, a timing diagram for a changeover from load to no-load operation, shows the same signals as FIG. 3 with the exception of the output signal of the passenger detector 32; in addition, it shows the switching state of the third contactor K3.

First, by means of FIG. 3, the process sequences in connection with a changeover of the escalator 10 from stoppage to loaded operation will be viewed.

At time $t_0$, the escalator 10 is at a standstill. In this state, neither of the two contactors K1 and K2 is made conductive and the output frequency of OVF 42 is zero.

At a time $t_1$, the passenger detector 32 determines that a passenger has entered the escalator 10. Thereupon, the passenger detector 32 outputs a signal indicating tat conveyance is required to the escalator control device 44 since the output signal of the passenger detector 32 has changed from L to H. This causes the escalator control device 44 to change the control signals "normal/stand-by" and "start/stop" which have been supplied to its outputs from L to H at time $t_2$. At time $t_2$, this, in turn, has the effect in OVF 42 that the control line SL2 changes the contactor K2 to the conductive state, whereby the drive motor 26 is the output of OVF 42, i.e. switched to the variable frequency converter. In this process, the contactor K3 is in the switch state in which the setpoint signal input Es of the phase detector 33 is the lines L2 and L3 of the power line. The output frequency of OVF 42 is supplied to the actual signal input Ei of the phase detector 33, i.e., initially, this is a frequency value of 0. Because the PLL device 30 attempts to bring the output frequency of OVF 42 to the line frequency, the output frequency of OVF 42 rises until the PLL device 30 locks to the line frequency.

Also, it is possible to set up OVF 42, for instance by programming, in such a way that the ramp of the increase of the output frequency of OVF 42 between $t_2$ and $t_3$, will not be determined by the operating speed of the PLL device, but that, instead, it will be set on a predetermined ramp increase value.

In the timing diagram shown in FIG. 3, the assumption is that at time t3 the PLL device 30 locks to the line frequency, i.e., that the output frequency of OVF 42 has been made to conform to the frequency and phase angle of the line voltage. The locking to the line frequency and line phase by the PLL device 30 causes the output of a control signal from OVF 42 to K2, which switches K2 to the nonconductive state. Due to the inherent timelag of K2, K2 does not change over to the nonconductive switching state until point in time t5. A zero-current state follows which lasts from $t_5$ to $t_6$, when the drive motor 26 is supplied neither by OVF 42 nor by the power line. The changeover of K1 from the nonconductive to the conductive state under the control of a control signal which is output by OVF 42 occurs at time $t_6$. From this time on, the drive motor 26 is supplied by the power line and the escalator 10 is under load.

This condition continues until no further need for conveyance exists. The assumption is made that the need for conveyance has ceased if, for a predefined period, the passenger detector 32 has not reported a passenger, i.e., the escalator 10 has not been boarded by a new passenger for a predefined period of time.

In the timing diagram shown in FIG. 4, it is assumed that, at time $t_7$, the escalator 10 is still under load, which is the case since time $t_6$ (FIG. 3), i.e., that it is still being supplied by the power line. It is also assumed that at time $t_8$, the predefined time period during which no new passenger has been detected, has elapsed.

Therefore, at time $t_8$, the control signal "normal/stand-by" changes from H to L, which initiates the changeover of the escalator 10 from load to no-load operation, and, thus, from power line supply to variable frequency converter supply. Because the PLL device 30 remains locked to the line frequency during the entire load operation and the output frequency of OVF 42 is therefore held at the frequency and phase angle of the line voltage during the entire time the escalator is under load, the changeover of the contactors K1 and K2 can occur immediately.

First, at time $t_9$, the contactor K1 is switched over to the nonconductive state and, after a time lag which lasts until time $t_{10}$, the contactor K2 is switched to the conductive state. Thus, the changeover of the escalator 10 from load to no-load operation and, hence, the changeover of the drive motor 26 from line supply to variable frequency converter supply, is concluded.

During the zero-current period, which extends from $t_9$ to $t_{10}$, the rotational speed of the drive motor 26 and, thus, the frequency of the motor terminal voltage decreases. Therefore, in the preferred embodiment of the invention shown in FIG. 2, the motor terminal voltage is fed to the phase detector 33 as the setpoint value during the zero-current period by having the OVF 42 control the conductor K3 to the switching state during the zero-current period of $t_9$ to $t_{10}$ in which the setpoint signal input Es of the phase detector 33 is connected to the supply terminals of the drive motor 26. Consequently, according to FIG. 4, the control signal for K3 changes from L to H during the zero-current period.

When, at time $t_{10}$, the contactor K2 is in the conductive state and the drive motor 26, is therefore connected to the output of OVF 42, the output voltage of OVF 42 is locked to the current motor terminal voltage in terms of frequency and phase, so that at time $t_{10}$, a smooth changeover of the motor to the variable frequency converter can occur.

During the zero-current period, not only does the rotational speed and thus the frequency of the motor terminal voltage decrease, but the amplitude of the motor terminal voltage drops as well. In order to realize a particularly smooth application of the variable frequency converter feeding, the voltage sensing device 46, by means of which the motor terminal voltage is detected during the zero-current period, is provided in a particularly preferred embodiment of the invention that is shown in FIG. 2. Moreover, OVF 42 is designed in such a way that the output voltage of the variable frequency converter can be changed. In this manner, the output voltage of the variable frequency converter can be reduced according to the amplitude of the motor terminal voltage which decreases during the zero-current period. Thus, the decrease in the amplitude and frequency of the motor terminal voltage during the zero-current period as a result of slippage and friction is compensated through an appropriate reduction in the frequency and amplitude of the variable frequency converter voltage, so that transient currents are minimized, which would be formed without such compensation, wherein the decrease in the motor terminal voltage is measured with a voltage sensing device or can be determined from the motor data.

After the changeover of K2 to the conductive state, the variable frequency converter lowers the frequency and amplitude of its output voltage in accordance with the first ramp which is shown in FIG. 4, until the values of the stand-by rotation speed have been reached. The stand-by operation is continued until either a new need for conveyance has been reported by the passenger detector 32 or until a predefined period since the time $t_{10}$ has passed without the passenger detector 32 reporting a new need for conveyance. In the latter case, the drive speed of the escalator 10 is lowered by an additional ramp which sets in at time $t_{11}$ until the frequency of OVF 42 has reached the value 0 at time $t_{12}$. At that time, K2 is also switched to the nonconductive state. From then on, the drive motor 26 is neither connected to the power line nor to the variable frequency converter 42, i.e. it remains without power.

The control signals which are fed to K1, K2, and K3 of OVF 42 are triggered when the PLL device 30 reaches of the locked state.

A particularly smooth changeover from no-load to load operation can be realized in a way in which at least the frequency, and preferably also the amplitude, of the output voltage of the variable frequency converter are controlled in such a way that they are above the frequency and amplitude of the line voltage by the amount by which the rotational speed and amplitude of the motor terminal voltage decrease during the zero-current period. The amount by which the motor rotational speed or the amplitude of the motor terminal voltage decrease during the zero-current period can be determined for the given conveyor system and can be taken into account in the design of the variable frequency converter. The output frequency of the variable frequency converter is then controlled to a value which, correspondingly, lies above the lock frequency of the PLL device 30.

There are various options of realizing the PLL device 30. Either the phase detector 33 and the loop filter 34 can be realized hardware or as software in part of the software of OVF 42. In the hardware solution, discrete or integrated circuit components may be used. In terms of cost the software solution is preferable. The PLL device 30 may be designed linear or digital.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

What is claimed is:

1. Process for controlling a drive means of a conveyor system (10), specifically, in a form of an escalator or a passenger conveyor, which can be switched between a load and a no-load operation, the drive means including a drive motor (26) and a variable frequency converter (42), wherein the frequency converter is at least controllable in terms of an output frequency of an output voltage, the process comprising the steps of:

supplying, the drive motor (26) with a line voltage with an essentially constant line frequency in the load operation;

supplying the drive motor (26), with the output voltage of the variable frequency converter (42) in the no-load operation;

wherein prior to a changeover from the no-load to the load operation or vice versa, essentially bringing the output frequency of the variable frequency converter (42) to the line frequency and determining that a phase of the line voltage is essentially in conformance with a phase of the output voltage of the variable frequency converter by means of a PLL device (30).

2. Process in accordance with claim 1, in which the inputs to the PLL device (30) include the line frequency as a setpoint phase and the output frequency of the variable frequency converter (42) as an actual phase.

3. Process in accordance with claim 1, in which the inputs to the PLL device (30) include the line frequency as a setpoint value and a control signal which controls the output frequency of the variable frequency converter (42) as an actual value.

4. Process in accordance with claim 3 wherein a ramp-line increase in the output frequency of the variable frequency converter (42) is controlled before the output frequency of the variable frequency converter (42) is brought to line frequency by means of the PLL device (30).

5. Process in accordance with claim 4, wherein a ramp-like decrease in the output frequency of the variable frequency converter (42) is controlled after the changeover has occurred from the line supply to the variable frequency converter supply.

6. Process in accordance with claim 5 in which, during the changeover, the drive motor (26) is operated without power for a duration of a zero-current period.

7. Process in accordance with claim 6, in which, during the zero-current period, the output frequency of the variable frequency converter (42) is brought to a frequency of a motor terminal voltage by means of the PLL device (30).

8. Process in accordance with claim 7, in which, during the zero-current period, the setpoint phase value is the frequency of the motor terminal voltage and the actual phase value is the output frequency of the variable frequency converter (42).

9. Process in accordance with claim 8, in which the output voltage of the variable frequency converter (42) is changed relative to the line voltage.

10. Process in accordance with claim 9, in which the motor terminal voltage is determined during the zero-current period.

11. Process in accordance with claim 10, in which the change in the motor terminal voltage is measured during the zero-current period.

12. Process in accordance with claim 10, in which the change in the motor terminal voltage is taken from motor data during the zero-current period.

13. Process in accordance with claim 12, in which the output voltage of the variable frequency converter (42) is brought to the motor terminal voltage during the zero-current period.

14. Electric control device for controlling a drive means of a conveyor system (10), specifically in a form of an escalator or passenger conveyor, the conveyor system comprising a line voltage input with an essentially constant line frequency and a drive motor (26), the control device comprising:

a variable frequency converter (42), which at least is controllable in terms of a frequency of its output voltage;

a controllable changeover system for switching between a load operation and a no-load operation wherein during the load operation, the drive motor (26) is supplied with the line voltage, and in the no-load operation is supplied with the output voltage of the variable frequency converter (42); and a PLL device (30) wherein, prior to a changeover from the no-load to the load operation or vice versa, the output frequency of the variable frequency converter (42) is, essentially regulated to the frequency and phase of the line voltage.

15. Control device in accordance with claim 14 in which the PLL device (30) comprises a setpoint phase input terminal for receiving the line frequency as the setpoint phase, and an actual phase input terminal for receiving the output frequency of the variable frequency converter (42) as the actual phase.

16. Control device in accordance with claim 14, wherein a setpoint phase is the line frequency an actual phase input is a control signal for controlling the output frequency of the variable frequency converter.

17. Control device in accordance with claim 16, in which the controllable changeover system comprises;

a first controllable switching device (K1) which connects the drive motor (26) with the line voltage; and a second controllable switching device (K2) which connects the drive motor to the variable frequency converter (42); where only one of the two switching devices (K1, K2) can be made conductive at one time and wherein the switching of the respectively nonconductive switching device (K1, K2) to a conductive state is only possible after a predefined zero-current period has elapsed.

18. Control device in accordance with claim 17, comprising a third controllable switching device (K3) in the form of a changeover switch by means of which the setpoint phase input terminal is connected to the line voltage in a first switching state and to a motor terminal at which the motor terminal voltage can be sensed in a second switching state, wherein the third switching device (K3) is controlled in such a way that, during the zero-current period, the setpoint phase input terminal is coupled to the motor terminal and is otherwise coupled to the line voltage terminal.

19. Control device in accordance with claim 18, in which the output voltage of the variable frequency converter (42) is controlled with respect to the line voltage.

20. Control device in accordance with claim 19, comprising:

a voltage detector, by means of which the motor terminal voltage is detectable during the zero-current period; and a voltage detector, by means of which the output voltage of the variable frequency converter (42) is controlled to the detected voltage value of the motor terminal voltage during the zero-current period.

21. Control device in accordance with claim 20, in which the variable frequency converter (42) comprises a switching device which determines its output voltage with switch control signals in the form of pulses which is triggerable with pulse width-modulated switch control signals, in order to control the output voltage of the variable frequency converter (42).

22. Control device in accordance with claim 21, in which the PLL device (30) comprises a phase detector, a loop filter, and a voltage-controlled oscillator.

23. Control device in accordance with claim 22 in which the phase detector and the loop filter are realized with hardware components.

24. Control device in accordance with claim 23, in which the variable frequency converter (42) and the PLL device (30) are integrated in a variable frequency converter circuit arrangement.

25. Control device in accordance with claim 24, in which the function of the phase detector and the loop filter are realized in software by programming the variable frequency converter circuit arrangement.

* * * * *